United States Patent
Wu et al.

(10) Patent No.: US 12,256,418 B2
(45) Date of Patent: Mar. 18, 2025

(54) MEASUREMENT FOR SIDELINK COMMUNICATIONS

(71) Applicant: QUALCOMM Incorporated, San Diego, CA (US)

(72) Inventors: Shuanshuan Wu, San Diego, CA (US); Kapil Gulati, Belle Mead, NJ (US); Junyi Li, Chester, NJ (US); Jose Edson Vargas, San Diego, CA (US); Sudhir Kumar Baghel, Hillsborough, NJ (US); Jung Ho Ryu, Fort Lee, NJ (US); Sony Akkarakaran, Poway, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 390 days.

(21) Appl. No.: 17/074,037

(22) Filed: Oct. 19, 2020

(65) Prior Publication Data

US 2021/0176767 A1 Jun. 10, 2021

Related U.S. Application Data

(60) Provisional application No. 62/944,165, filed on Dec. 5, 2019.

(51) Int. Cl.
*H04W 72/04* (2023.01)
*H04B 7/0408* (2017.01)
(Continued)

(52) U.S. Cl.
CPC ........ *H04W 72/542* (2023.01); *H04B 7/0408* (2013.01); *H04W 24/10* (2013.01)

(58) Field of Classification Search
None
See application file for complete search history.

(56) References Cited

U.S. PATENT DOCUMENTS

| 2015/0071191 | A1 | 3/2015 | Kim et al. |
| 2016/0150435 | A1* | 5/2016 | Baek .................... H04B 7/0608 370/252 |

(Continued)

FOREIGN PATENT DOCUMENTS

| CN | 107852630 A | 3/2018 |
| CN | 110289896 A | 9/2019 |

(Continued)

OTHER PUBLICATIONS

International Search Report and Written Opinion—PCT/US2020/056493—ISA/EPO—Dec. 14, 2020.

(Continued)

*Primary Examiner* — Scott M Sciacca
(74) *Attorney, Agent, or Firm* — Patterson + Sheridan, L.L.P.

(57) ABSTRACT

Certain aspects of the present disclosure are directed to a method for wireless communication by a network entity. The method generally includes generating a configuration message for a user-equipment (UE) to perform one or more reference signal (RS) measurements on one or more resources of a sidelink channel, transmitting the measurement configuration message, receiving a measurement report indicating results of the one or more RS measurements, and transmitting a scheduling message indicating resources for sidelink transmission on the sidelink channel.

27 Claims, 11 Drawing Sheets

(51) Int. Cl.
*H04W 24/10* (2009.01)
*H04W 72/542* (2023.01)
*H04W 76/14* (2018.01)

(56) References Cited

U.S. PATENT DOCUMENTS

| | | | | |
|---|---|---|---|---|
| 2018/0054237 | A1* | 2/2018 | Tseng | H04W 72/085 |
| 2020/0028655 | A1* | 1/2020 | Kakishima | H04L 5/0073 |
| 2021/0100059 | A1* | 4/2021 | Xu | H04B 7/06954 |
| 2021/0258063 | A1* | 8/2021 | Ottersten | H04W 24/10 |
| 2021/0282099 | A1* | 9/2021 | Osawa | H04W 72/12 |
| 2021/0368372 | A1* | 11/2021 | Chen | H04W 76/14 |

FOREIGN PATENT DOCUMENTS

| | | |
|---|---|---|
| CN | 110536316 A | 12/2019 |
| WO | 2019221650 A1 | 11/2019 |

OTHER PUBLICATIONS

LG Electronics: "Discussion on Interference Measurement and Reporting", 3GPP Draft; 3GPP TSG RAN WG1 Meeting #87, R1-1611823, 3rd Generation Partnership Project (3GPP), Mobile Competence Centre; 650, Route Des Lucioles; F-06921 Sophia-Antipolis Cedex; France, vol. RAN WG1, No. Reno, USA; Nov. 14, 2016-Nov. 18, 2016, Nov. 13, 2016, XP051175792, 6 pages,. Nov. 16, 2013] the whole document.

LG Electronics Inc: "Discussion on Measurement and Report in NR SL", 3GPP Draft; 3GPP TSG RAN WG2 Meeting #108, R2-1915517, 3rd Generation Partnership Project (3GPP), Mobile Competence Centre, 650, Route Des Lucioles, F-06921, Sophia-Anti Polis Cedex, France, vol. RAN WG2, No. Reno, USA; Nov. 18, 2019-Nov. 22, 2019, Nov. 8, 2019 (Nov. 8, 2019), XP051817259, pp. 1-6.

* cited by examiner

MEASUREMENT FOR SIDELINK COMMUNICATIONS

CROSS-REFERENCE TO RELATED APPLICATION

This application claims benefit of and priority to U.S. Provisional Application No. 62/944,165, filed Dec. 5, 2019, which is hereby assigned to the assignee hereof and hereby expressly incorporated by reference herein in its entirety as if fully set forth below and for all applicable purposes.

BACKGROUND

Field of the Disclosure

Aspects of the present disclosure relate to wireless communications, and more particularly, to techniques for sidelink communication.

Description of Related Art

Wireless communication systems are widely deployed to provide various telecommunication services such as telephony, video, data, messaging, broadcasts, etc. These wireless communication systems may employ multiple-access technologies capable of supporting communication with multiple users by sharing available system resources (e.g., bandwidth, transmit power, etc.). Examples of such multiple-access systems include 3rd Generation Partnership Project (3GPP) Long Term Evolution (LTE) systems, LTE Advanced (LTE-A) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems, to name a few.

These multiple access technologies have been adopted in various telecommunication standards to provide a common protocol that enables different wireless devices to communicate on a municipal, national, regional, and even global level. New radio (e.g., 5G NR) is an example of an emerging telecommunication standard. NR is a set of enhancements to the LTE mobile standard promulgated by 3GPP. NR is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL). To these ends, NR supports beamforming, multiple-input multiple-output (MIMO) antenna technology, and carrier aggregation.

However, as the demand for mobile broadband access continues to increase, there exists a need for further improvements in NR and LTE technology. Preferably, these improvements should be applicable to other multi-access technologies and the telecommunication standards that employ these technologies.

SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved sidelink signaling.

Certain aspects of the present disclosure are directed to a method for wireless communication by a network entity. The method generally includes generating a configuration message for a user-equipment (UE) to perform one or more reference signal (RS) measurements on one or more resources of a sidelink channel, transmitting the measurement configuration message, receiving a measurement report indicating results of the one or more RS measurements, and transmitting a scheduling message indicating resources for sidelink transmission on the sidelink channel.

Certain aspects of the present disclosure are directed to a method for wireless communication by a UE. The method generally includes performing one or more RS measurements on one or more resources of a sidelink channel, generating a measurement report indicating results of the one or more RS measurements, and transmitting the measurement report to a network entity to be used for scheduling of sidelink transmissions on the sidelink channel.

Certain aspects of the present disclosure are directed to a method for wireless communication by a UE. The method generally includes receiving, from a network entity, a configuration message for transmission of one or more RSs on one or more resources on a sidelink channel to be used for RS measurement by another UE, and taking one or more actions to facilitate the RS measurement by the other UE in accordance with the configuration message.

Certain aspects of the present disclosure are directed to an apparatus for wireless communication by a network entity. The apparatus generally includes a memory and one or more processors coupled to the memory, the one or more processors being configured to generate a configuration message for a UE to perform one or more RS measurements on one or more resources of a sidelink channel, transmitting the measurement configuration message, receive a measurement report indicating results of the one or more RS measurements, and transmit a scheduling message indicating resources for sidelink transmission on the sidelink channel.

Certain aspects of the present disclosure are directed to an apparatus for wireless communication by a UE. The apparatus generally includes a memory and one or more processors coupled to the memory, the one or more processors being configured to perform one or more RS measurements on one or more resources of a sidelink channel, generate a measurement report indicating results of the one or more RS measurements, and transmit the measurement report to a network entity to be used for scheduling of sidelink transmissions on the sidelink channel.

Certain aspects of the present disclosure are directed to an apparatus for wireless communication by a UE. The apparatus generally includes a memory and one or more processors coupled to the memory, the one or more processors being configured to receive a configuration message for transmission of one or more RSs on one or more resources on a sidelink channel to be used for RS measurement by another UE, and taking one or more actions to facilitate the RS measurement by the other UE in accordance with the configuration message.

Certain aspects of the present disclosure are directed to an apparatus for wireless communication by a network entity. The apparatus generally includes means for generating a configuration message for a UE to perform one or more RS measurements on one or more resources of a sidelink channel, transmitting the measurement configuration message, means for receiving a measurement report indicating results of the one or more RS measurements, and means for transmitting a scheduling message indicating resources for sidelink transmission on the sidelink channel.

Certain aspects of the present disclosure are directed to an apparatus for wireless communication by a UE. The method generally includes performing one or more RS measurements on one or more resources of a sidelink channel, means for generating a measurement report indicating results of the one or more RS measurements, and means for transmitting the measurement report to a network entity to be used for scheduling of sidelink transmissions on the sidelink channel.

Certain aspects of the present disclosure are directed to an apparatus for wireless communication by a UE. The method generally includes means for receiving a configuration message for transmission of one or more RSs on one or more resources on a sidelink channel to be used for RS measurement by another UE, and means for taking one or more actions to facilitate the RS measurement by the other UE in accordance with the configuration message.

Certain aspects of the present disclosure are directed to a computer-readable medium having instructions stored thereon to cause a network entity to generate a configuration message for a UE to perform one or more RS measurements on one or more resources of a sidelink channel, transmit the measurement configuration message, receive a measurement report indicating results of the one or more RS measurements, and transmit a scheduling message indicating resources for sidelink transmission on the sidelink channel.

Certain aspects of the present disclosure are directed to a computer-readable medium having instructions stored thereon to cause a UE to perform one or more RS measurements on one or more resources of a sidelink channel, generate a measurement report indicating results of the one or more RS measurements, and transmit the measurement report to a network entity to be used for scheduling of sidelink transmissions on the sidelink channel.

Certain aspects of the present disclosure are directed to a computer-readable medium having instructions stored thereon to cause a UE to receive a configuration message for transmission of one or more RSs on one or more resources on a sidelink channel to be used for RS measurement by another UE, and take one or more actions to facilitate the RS measurement by the other UE in accordance with the configuration message.

To the accomplishment of the foregoing and related ends, the one or more aspects comprise the features hereinafter fully described and particularly pointed out in the claims. The following description and the appended drawings set forth in detail certain illustrative features of the one or more aspects. These features are indicative, however, of but a few of the various ways in which the principles of various aspects may be employed.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the drawings. It is to be noted, however, that the appended drawings illustrate only certain typical aspects of this disclosure and are therefore not to be considered limiting of its scope, for the description may admit to other equally effective aspects.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Aspects of the present disclosure provide apparatus, methods, processing systems, and computer readable mediums for sidelink communication.

The following description provides examples of sidelink in communication systems, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to, or other than, the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a subcarrier, a frequency channel, a tone, a subband, etc. Each frequency may support a single RAT in a given geographic area in order to avoid interference between wireless networks of different RATs. In some cases, a 5G NR RAT network may be deployed.

Figure 1:
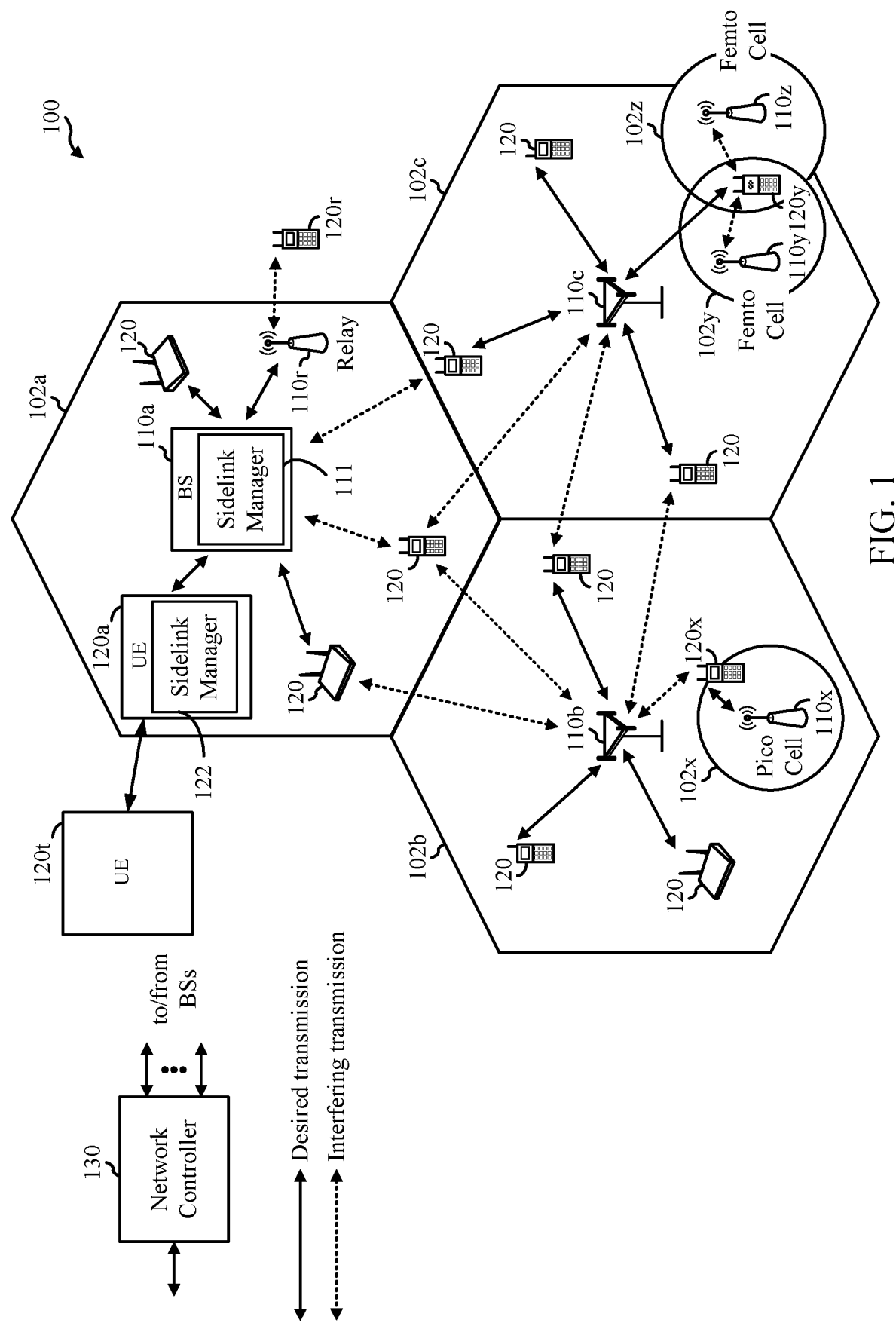
FIG. 1 is a block diagram conceptually illustrating an example telecommunications system, in accordance with certain aspects of the present disclosure.

FIG. 1 illustrates an example wireless communication network 100 in which aspects of the present disclosure may be performed. For example, the wireless communication network 100 may be an NR system (e.g., a 5G NR network).

As illustrated in FIG. 1, the wireless communication network 100 may include a number of base stations (BSs) 110a-z (each also individually referred to herein as BS 110 or collectively as BSs 110) and other network entities. A BS 110 may provide communication coverage for a particular geographic area, sometimes referred to as a "cell", which may be stationary or may move according to the location of a mobile BS 110. In some examples, the BSs 110 may be interconnected to one another and/or to one or more other BSs or network nodes (not shown) in wireless communication network 100 through various types of backhaul interfaces (e.g., a direct physical connection, a wireless connection, a virtual network, or the like) using any suitable transport network. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BSs for the femto cells 102y and 102z, respectively. A BS may support one or multiple cells. The BSs 110 communicate with user equipment (UEs) 120a-y (each also individually referred to herein as UE 120 or collectively as UEs 120) in the wireless communication network 100. The UEs 120 (e.g., 120x, 120y, etc.) may be dispersed throughout the wireless communication network 100, and each UE 120 may be stationary or mobile.

According to certain aspects, the BSs 110 and UEs 120 may be configured for sidelink communication. As shown in FIG. 1, the UE 120a includes a sidelink manager 122. The sidelink manager 122 may be configured to perform reference signal (RS) measurements for sidelink communication between the UE 120a and UE 120t, in accordance with aspects of the present disclosure. The BS 110a may also include a sidelink manager 111 that facilitates the RS measurements.

As shown in FIG. 1, the UE 120a includes a sidelink manager 122. The sidelink manager 122 may be configured to determine a distance between the UE 120a and UE 120t, based on which the UE may determine whether to transmit HARQ feedback, in accordance with aspects of the present disclosure.

Wireless communication network 100 may also include relay stations (e.g., relay station 110r), also referred to as relays or the like, that receive a transmission of data and/or other information from an upstream station (e.g., a BS 110a or a UE 120r) and sends a transmission of the data and/or other information to a downstream station (e.g., a UE 120 or a BS 110), or that relays transmissions between UEs 120, to facilitate communication between devices.

A network controller 130 may couple to a set of BSs 110 and provide coordination and control for these BSs 110. The network controller 130 may communicate with the BSs 110 via a backhaul. The BSs 110 may also communicate with one another (e.g., directly or indirectly) via wireless or wireline backhaul.

Figure 2:
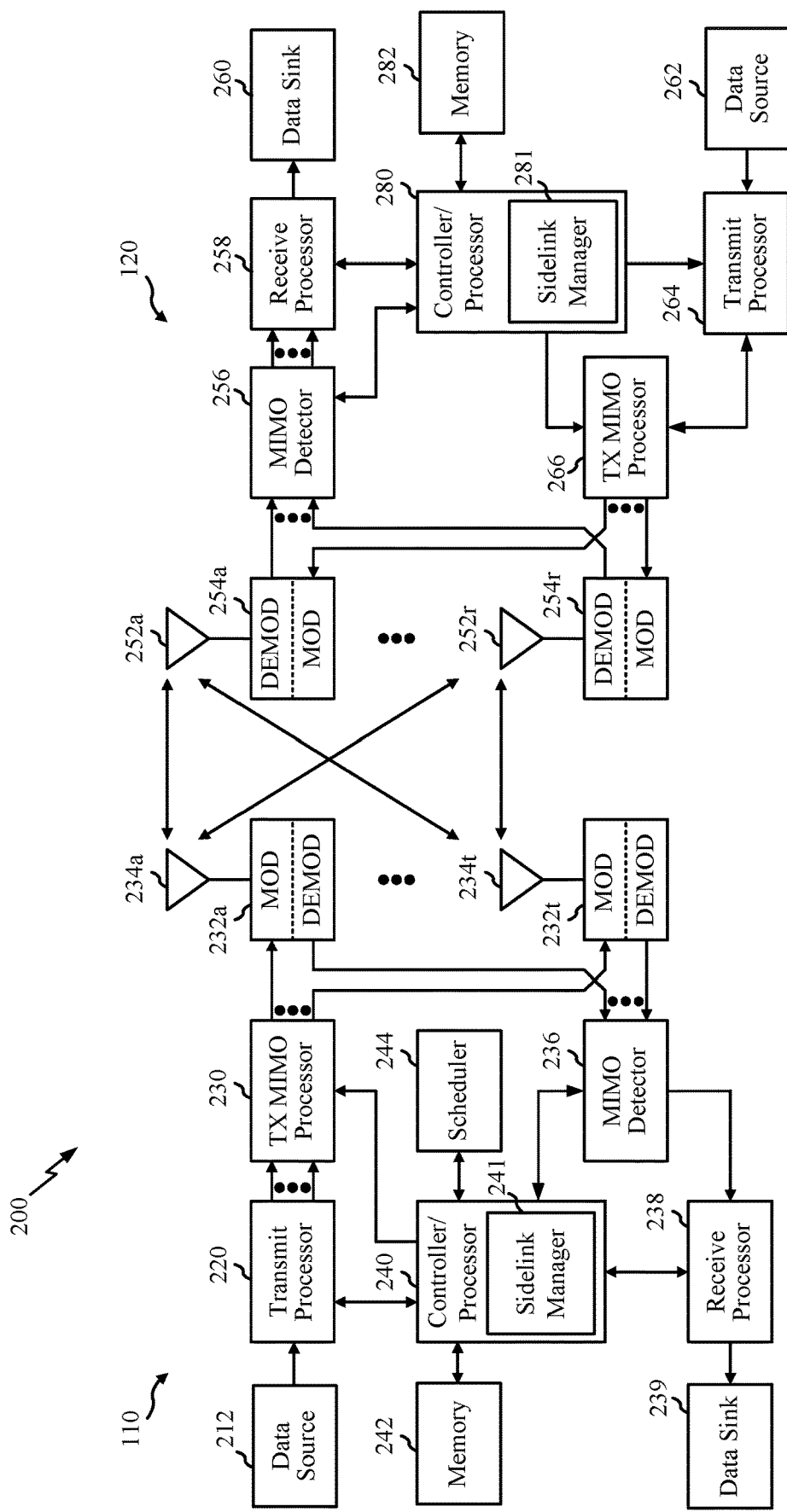
FIG. 2 is a block diagram conceptually illustrating a design of an example a base station (BS) and user equipment (UE), in accordance with certain aspects of the present disclosure.

FIG. 2 illustrates example components of BS 110a and UE 120a (e.g., in the wireless communication network 100 of FIG. 1), which may be used to implement aspects of the present disclosure.

At the BS 110a, a transmit processor 220 may receive data from a data source 212 and control information from a controller/processor 240. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), etc. The data may be for the physical downlink shared channel (PDSCH), etc. The processor 220 may process (e.g., encode and symbol map) the data and control information to obtain data symbols and control symbols, respectively. The transmit processor 220 may also generate reference symbols, such as for the primary synchronization signal (PSS), secondary synchronization signal (SSS), and cell-specific reference signal (CRS). A transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) 232a-232t. Each modulator 232 may process a respective output symbol stream (e.g., for OFDM, etc.) to obtain an output sample stream. Each modulator may further process (e.g., convert to analog, amplify, filter, and upconvert) the output sample stream to obtain a downlink signal. Downlink signals from modulators 232a-232t may be transmitted via the antennas 234a-234t, respectively.

At the UE 120a, the antennas 252a-252r may receive the downlink signals from the BS 110a and may provide received signals to the demodulators (DEMODs) in transceivers 254a-254r, respectively. Each demodulator 254 may condition (e.g., filter, amplify, downconvert, and digitize) a respective received signal to obtain input samples. Each demodulator may further process the input samples (e.g., for OFDM, etc.) to obtain received symbols. A MIMO detector 256 may obtain received symbols from all the demodulators 254a-254r, perform MIMO detection on the received symbols if applicable, and provide detected symbols. A receive processor 258 may process (e.g., demodulate, deinterleave, and decode) the detected symbols, provide decoded data for the UE 120a to a data sink 260, and provide decoded control information to a controller/processor 280.

On the uplink, at UE 120a, a transmit processor 264 may receive and process data (e.g., for the physical uplink shared channel (PUSCH)) from a data source 262 and control information (e.g., for the physical uplink control channel (PUCCH) from the controller/processor 280. The transmit processor 264 may also generate reference symbols for a reference signal (e.g., for the sounding reference signal (SRS)). The symbols from the transmit processor 264 may be precoded by a TX MIMO processor 266 if applicable, further processed by the demodulators in transceivers 254a-254r (e.g., for SC-FDM, etc.), and transmitted to the BS 110a. At the BS 110a, the uplink signals from the UE 120a may be received by the antennas 234, processed by the modulators 232, detected by a MIMO detector 236 if applicable, and further processed by a receive processor 238 to obtain decoded data and control information sent by the UE 120a. The receive processor 238 may provide the decoded data to a data sink 239 and the decoded control information to the controller/processor 240.

The memories 242 and 282 may store data and program codes for BS 110a and UE 120a, respectively. A scheduler 244 may schedule UEs for data transmission on the downlink and/or uplink.

The controller/processor 280 and/or other processors and modules at the UE 120a may perform or direct the execution of processes for the techniques described herein. As shown in FIG. 2, the controller/processor 280 of the UE 120a has a sidelink manager 281 that may be configured to perform RS measurements for a sidelink channel, according to aspects described herein. In certain aspects, the BS 110 may also include sidelink manager 241 that facilitates the RS measurements. Although shown at the Controller/Processor, other components of the UE 120a and BS 110a may be used performing the operations described herein.

Figure 3B:
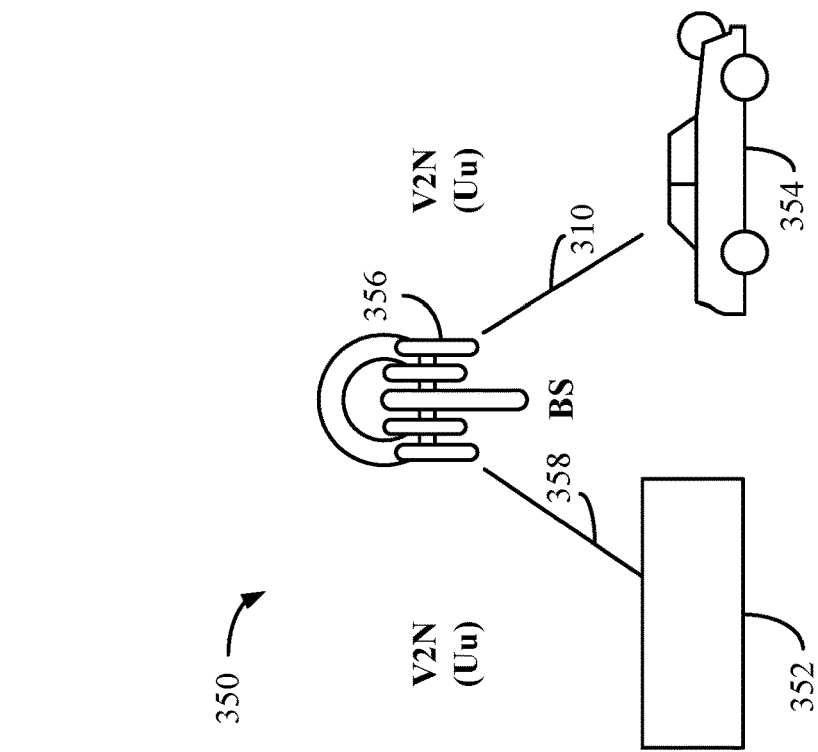
FIGS. 3A and 3B show diagrammatic representations of example vehicle to everything (V2X) systems in accordance with some aspects of the present disclosure.
Figure 3A:
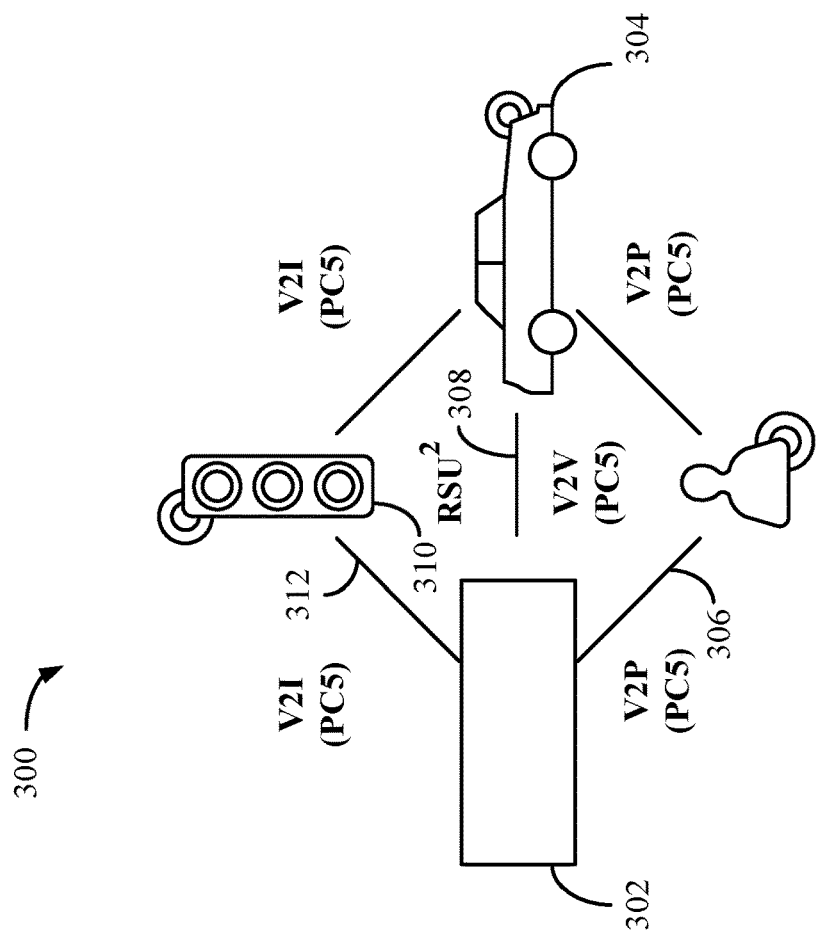

FIGS. 3A and 3B show diagrammatic representations of example vehicle to everything (V2X) systems in accordance with some aspects of the present disclosure. For example, the UEs shown in FIGS. 3A and 3B may communicate via sidelink channels and may perform sidelink CSI reporting as described herein.

The V2X systems, provided in FIGS. 3A and 3B provide two complementary transmission modes. A first transmission mode, shown by way of example in FIG. 3A, involves direct communications (for example, also referred to as side link communications) between participants in proximity to one another in a local area. A second transmission mode, shown by way of example in FIG. 3B, involves network communications through a network, which may be implemented over a Uu interface (for example, a wireless communication interface between a radio access network (RAN) and a UE).

Referring to FIG. 3A, a V2X system 300 (for example, including vehicle to vehicle (V2V) communications) is illustrated with two UEs 302, 304 (e.g., vehicles). The first transmission mode allows for direct communication between different participants in a given geographic location. As illustrated, a vehicle can have a wireless communication link 306 with an individual (V2P) (for example, via a UE) through a PC5 interface. Communications between the UEs 302 and 304 may also occur through a PC5 interface 308. In a like manner, communication may occur from a UE 302 to other highway components (for example, highway component 310), such as a traffic signal or sign (V2I) through a PC5 interface 312. With respect to each communication link illustrated in FIG. 3A, two-way communication may take place between elements, therefore each element may be a transmitter and a receiver of information. The V2X system 300 may be a self-managed system implemented without assistance from a network entity. A self-managed system may enable improved spectral efficiency, reduced cost, and increased reliability as network service interruptions do not occur during handover operations for moving vehicles. The V2X system may be configured to operate in a licensed or unlicensed spectrum, thus any vehicle with an equipped system may access a common frequency and share information. Such harmonized/common spectrum operations allow for safe and reliable operation.

FIG. 3B shows a V2X system 350 for communication between a UE 352 (e.g., vehicle) and a UE 354 (e.g., vehicle) through a network entity 356. These network communications may occur through discrete nodes, such as a base station (for example, an eNB or gNB), that sends and receives information to and from (for example, relays information between) UEs 352, 354. The network communications through vehicle to network (V2N) links 358 and 310 may be used, for example, for long range communications between vehicles, such as for communicating the presence of a car accident a distance ahead along a road or highway. Other types of communications may be sent by the node to vehicles, such as traffic flow conditions, road hazard warnings, environmental/weather reports, and service station availability, among other examples. Such data can be obtained from cloud-based sharing services.

In some circumstances, two or more subordinate entities (for example, UEs) may communicate with each other using sidelink signals. As described above, V2V and V2X communications are examples of communications that may be transmitted via a sidelink. Other applications of sidelink communications may include public safety or service announcement communications, communications for proximity services, communications for UE-to-network relaying, device-to-device (D2D) communications, Internet of Everything (IoE) communications, Internet of Things (IoT) communications, mission-critical mesh communications, among other suitable applications. Generally, a sidelink may refer to a direct link between one subordinate entity (for example, UE1) and another subordinate entity (for example, UE2). As such, a sidelink may be used to transmit and receive a communication (also referred to herein as a "sidelink signal") without relaying the communication through a scheduling entity (for example, a BS), even though the scheduling entity may be utilized for scheduling or control purposes. In some examples, a sidelink signal may be communicated using a licensed spectrum (unlike wireless local area networks, which typically use an unlicensed spectrum).

Various sidelink channels may be used for sidelink communications, including a physical sidelink discovery channel (PSDCH), a physical sidelink control channel (PSCCH), a physical sidelink shared channel (PSSCH), and a physical sidelink feedback channel (PSFCH). The PSDCH may carry discovery expressions that enable proximal devices to discover each other. The PSCCH may carry control signaling such as sidelink resource configurations and other parameters used for data transmissions, and the PSSCH may carry the data transmissions. The PSFCH may carry feedback such as channel state information (CSI) related to a sidelink channel quality.

Example Techniques for Measurement for Sidelink Communications

Certain aspects of the present disclosure are generally directed to sidelink communication (e.g., communication between UEs, such as vehicle-to-vehicle <V2V/V2X> communications, as described with respect to FIGS. 3A and 3B). In sidelink communications, beamforming may be employed to improve performance. For example, a sidelink transmitter (Tx) UE may perform precoding to a sidelink control or data channel transmission, which results in a directional beam. For sidelink in frequency range 1 (FR1) (sub-6 GHz), beamforming may improve sidelink communication range. For sidelink in FR2 (carrier frequency higher than 6 GHz, or MmWave), beamforming may be necessary to overcome the large scale fading (e.g., path loss).

Beamforming also has the potential to improve throughput, since multiple beams may use the same time-frequency resource in, e.g., an OFDM system. Sharing of time-frequency resource is possible when multiple beams are orthogonal (e.g., having different direction). As one example, multiple sidelink Tx UEs may transmit different directional beams on the same resource. As another example, a sidelink Tx UE and an uplink Tx UE may transmit different directional beams on the same resource. Certain aspects of the present disclosure are directed to resource sharing for sidelink communications with assistance from a base station (BS) (e.g., gNB).

Figure 4:
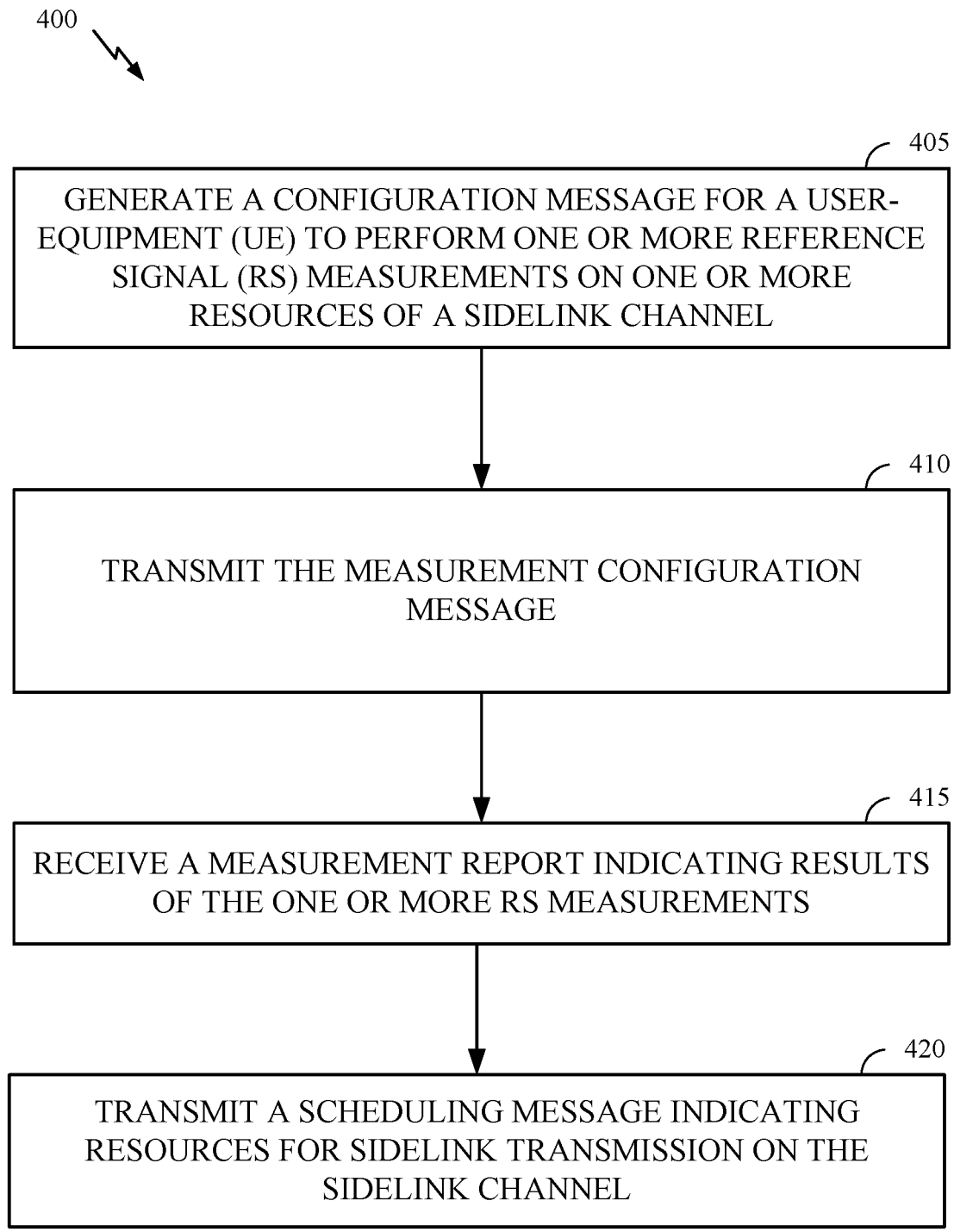
FIG. 4 is a flow diagram illustrating example operations for wireless communication, in accordance with certain aspects of the present disclosure.

FIG. 4 is a flow diagram illustrating example operations 400 for wireless communication, in accordance with certain aspects of the present disclosure. The operations 400 may be performed, for example, by a network entity (e.g., such as the BS 110a in the wireless communication network 100).

Operations 400 may be implemented as software components that are executed and run on one or more processors (e.g., controller/processor 240 of FIG. 2). Further, the transmission and reception of signals by the BS in operations 400 may be enabled, for example, by one or more antennas (e.g., antennas 234 of FIG. 2). In certain aspects, the transmission and/or reception of signals by the BS may be implemented via a bus interface of one or more processors (e.g., controller/processor 240) obtaining and/or outputting signals.

The operations 400 may begin, at block 405, with the network entity generating a configuration message for a user-equipment (UE) (e.g., Rx UE) to perform one or more reference signal (RS) measurements on one or more resources of a sidelink channel, and at block 410, transmitting the measurement configuration message. At block 415, the network entity may receive a measurement report indicating results of the one or more RS measurements, at block 420, transmit a scheduling message indicating resources for sidelink transmission on the sidelink channel. In some cases, the measurement configuration message is transmitted to another UE (e.g., Tx UE), and the measurement report is received from the other UE. In some cases, the sidelink transmission are between the other UE and the UE.

In certain aspects, performing the one or more RS measurements may include performing one or more zero power (ZP) RS measurements (e.g., also referred to as interference measurements (IMs)) on the one or more resources of the sidelink channel. In some cases, the sidelink transmission may include transmission from another UE (e.g., Tx UE) to the UE (e.g., Rx UE). Performing the RS measurements may include performing RS measurements based on at least one RS transmitted by the other UE.

In certain aspects, the configuration message may indicate to the UE to perform the RS measurements for multiple beams, and the measurement report may indicate at least one of the multiple beams. The scheduling message may indicate a beam of the multiple beams to be used for the sidelink transmission based on the measurement report. In some cases, the at least one of the multiple beams may be a beam having the highest signal quality of the multiple beams. In some cases, the measurement report may indicate a parameters indicating signal quality associated with the multiple beams.

In certain aspects, the resources scheduled for the sidelink transmission may be shared by the UE and at least one other UE. The resources may be used for transmission by the at least on other UE for uplink transmission. In some cases, the resources may be used for transmission by the at least on other UE for sidelink transmission.

In certain aspects, the operations 400 may also include receiving measurement request, where the generation of the measurement configuration message is in response to the measurement request. In certain aspects, the configuration message may include a measurement configuration message indicating to the UE to perform the RS measurements. In certain aspects, the configuration message may include a RS configuration message configuring one or more RSs for the RS measurements.

Figure 5:
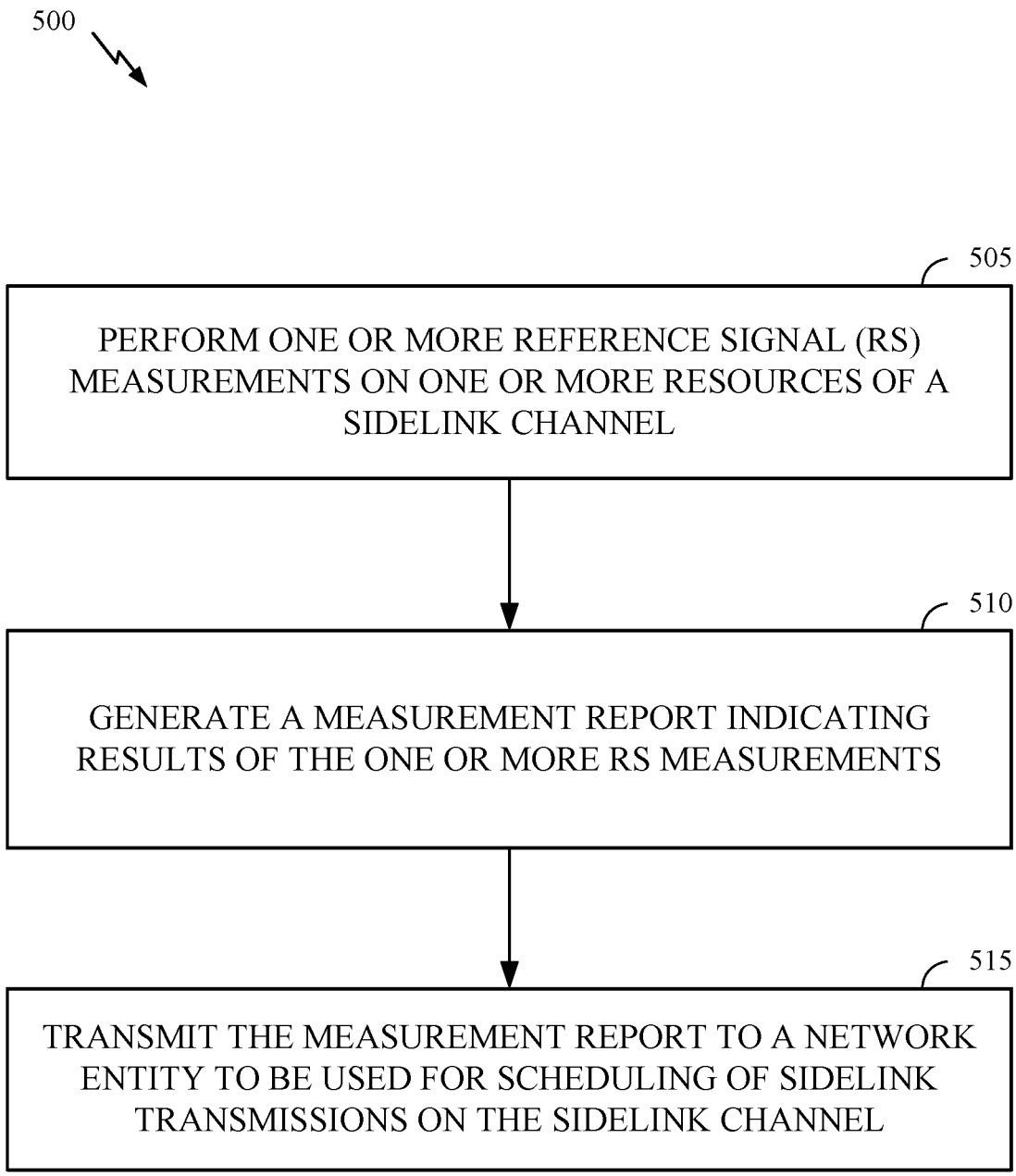
FIG. 5 is a flow diagram illustrating example operations for wireless communication, in accordance with certain aspects of the present disclosure.

FIG. 5 is a flow diagram illustrating example operations 500 for wireless communication, in accordance with certain aspects of the present disclosure. The operations 500 may be performed, for example, by an Rx UE (e.g., such as a UE 120a in the wireless communication network 100).

The operations 500 may be complimentary operations by the Rx UE to the operations 500 performed by the network entity. Operations 500 may be implemented as software components that are executed and run on one or more processors (e.g., controller/processor 280 of FIG. 2). Further, the transmission and reception of signals by the UE in operations 500 may be enabled, for example, by one or more antennas (e.g., antennas 252 of FIG. 2). In certain aspects, the transmission and/or reception of signals by the UE may be implemented via a bus interface of one or more processors (e.g., controller/processor 280) obtaining and/or outputting signals.

The operations 500 may begin, at block 505, with the UE performing one or more RS measurements on one or more resources of a sidelink channel, and at block 510, generating a measurement report indicating results of the one or more RS measurements. At block 515, the UE transmits the measurement report to a network entity to be used for scheduling of sidelink transmissions on the sidelink channel.

Figure 6:
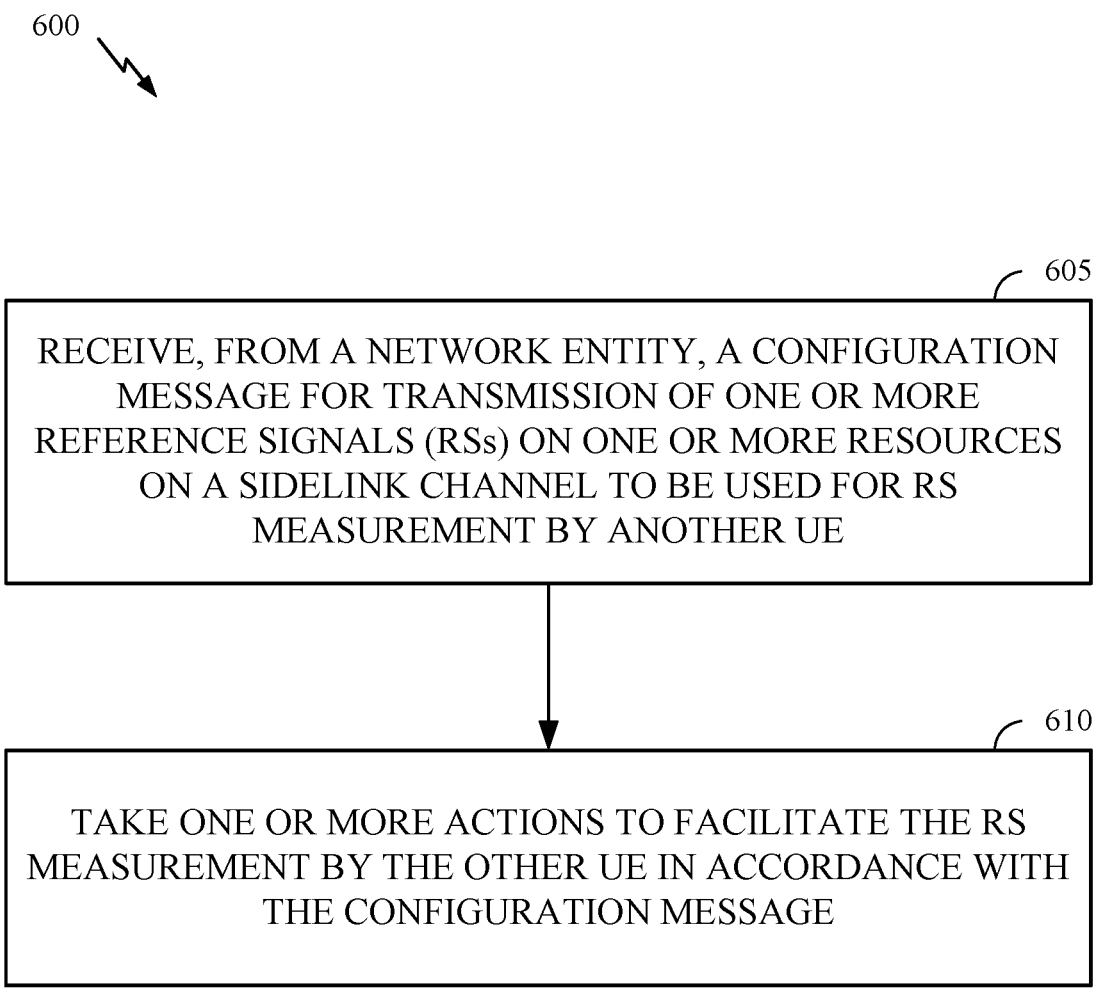
FIG. 6 is a flow diagram illustrating example operations for wireless communication, in accordance with certain aspects of the present disclosure.

FIG. 6 is a flow diagram illustrating example operations 600 for wireless communication, in accordance with certain aspects of the present disclosure. The operations 600 may be performed, for example, by a Tx UE (e.g., such as a UE 120a in the wireless communication network 100).

The operations 600 may be complimentary operations by the Tx UE to the operations 400 performed by the network entity and the operations 500 performed by the Rx UE. Operations 600 may be implemented as software components that are executed and run on one or more processors (e.g., controller/processor 280 of FIG. 2). Further, the transmission and reception of signals by the UE in operations 600 may be enabled, for example, by one or more antennas (e.g., antennas 252 of FIG. 2). In certain aspects, the transmission and/or reception of signals by the UE may be implemented via a bus interface of one or more processors (e.g., controller/processor 280) obtaining and/or outputting signals.

The operations 600 may begin, at block 605, with the UE receiving a configuration message for transmission of one or more RSs on one or more resources on a sidelink channel to be used for RS measurement by another UE, and at block 610, take one or more actions to facility the RS measurement by the other UE in accordance with the configuration message. For example, the Tx UE may transmit the one or more RSs to the other UE in accordance with the configuration message. In a case the configuration message configures resources for one or more zero-power RSs, the one or more actions may include forgoing transmitting using the resources in accordance with the configuration (e.g., to facilitate ZP RS measurement).

In some cases, the configuration message may include a measurement configuration message indicating to the other UE to perform the RS measurement. In this case, the operations 600 may also including transmitting, to the other UE, a configuration message indicating to the other UE to perform the RS measurement. In some cases, the Tx UE may also receive, from the other UE, a measurement report indicating results of the RS measurement, and transmitting the measurement report to the network entity. In other words, the Tx UE may act as a relay for communication of the measurement report from the Rx UE to the network entity (e.g. BS), as described in more detail herein.

Figure 7:
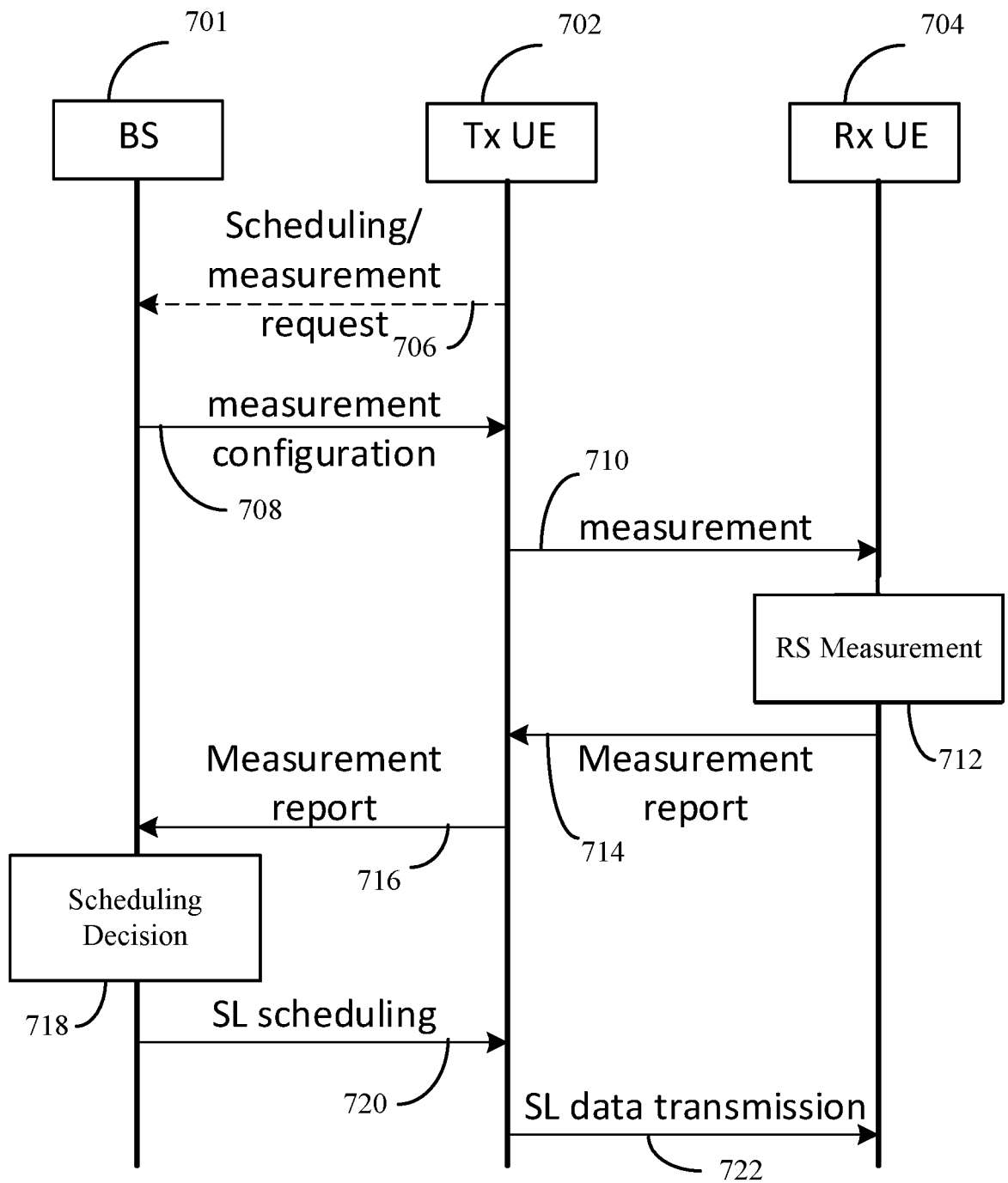
FIG. 7 is a call flow diagram illustrating example operations for scheduling sidelink communication, in accordance with certain aspects of the present disclosure.

FIG. 7 is a call flow diagram illustrating example operations for scheduling sidelink communication, in accordance with certain aspects of the present disclosure. As illustrated, a network entity 701 (e.g., BS) may, optionally, receive a scheduling/measurement request 706 from Tx UE 702. The network entity 701 may then indicate, to a sidelink Rx UE 704, to perform reference signal (RS) measurement on a set of resources. For example, the network entity 701 may transmit the measurement configuration 708 to the Rx UE.

In some cases, the Rx UE may not be connected to the network entity 701 directly. In this case, the measurement configuration 708 may be transmitted to the Tx UE 702 and the sidelink Tx UE 702 may send the measurement indication (e.g., measurement configuration 710) to the Rx UE 704. At block 712, the Rx UE 704 measures the resources based on the indication. The measurement may be received signal strength indicator (RSSI), reference signal received power (RSRP), reference signal received quality (RSRQ), channel state information (CSI), or channel busy ratio (CBR) measurement. The Rx UE 704 may then report the measurements to the network entity 701. As described herein, the Rx UE 704 may not be connected to the network entity 701 directly, and thus, may report the measurement (e.g., send measurement report 714) to the Tx UE 702, which may forward the report (e.g., send measurement report 716) to network entity 701.

The network entity 701 then makes a scheduling decision based on the measurement report, and at block 718, and schedules sidelink transmissions. For example, the network entity may transmit a sidelink (SL) scheduling message 720 to the Tx UE 702 to schedule the SL data transmission 722 to the Rx UE 704.

In some cases, the Rx UE may be indicated (e.g., via measurement configuration 708) to measure a set of resources that the Tx UE is not transmitting on. For instance, the set of resources may correspond to zero power (ZP)-CSI-RS resources (also referred to as "CSI interference measurement (IM) resources"). In the ZP-CSI-RS resources, the Tx UE does not transmit, but rather, another UE may transmit CSI-RS or other signals in the ZP-CSI-RS resources. Therefore, the measurement performed by the RX UE reflects the interference level in the set of measurement resources. In other words, the measurement report may indicate the power level of signals from an undesired transmitter (e.g., the undesired transmitter transmitting in the ZP-CSI-RS resource), allowing the network entity to schedule resources shared by multiple UEs. In other words, based on the measurement report, the network entity may be able to determine whether transmissions from undesired UE(s) would cause interference to reception of transmissions from the Tx UE, and thus make decisions on whether the resource allocated to the undesired UE(s) can be allocated to and reused by the Tx UE.

In certain aspects, the measurement configuration indicates to the Rx UE to measure a set of resources that the Tx UE is transmitting on. For instance, the set of resource may be used for a certain reference signal the Tx UE is transmitting such as CSI-RS, sounding reference signal (SRS), demodulation reference signal (DMRS), synchronization signal block (SSB), etc. In this case, the measurement reflects at least the Tx UE's signal strength/quality observed at the Rx UE. In some cases, the Rx UE may be indicated to measure the interference level, the TX UEs signal strength/quality, or both. As described herein, the measurement report may be reported, by the Rx UE to the BS (e.g., through the Tx UE 702).

In certain aspects, the configured measurement resources may include multiple measurement occasions. For example, the Rx UE may be indicated to measure RSs transmitted during configured measurement resources. Each of the RS transmissions may have a different beamforming applied. For example, each of the RSs may be transmitted in a certain beam direction (e.g., different beam directions). The RSs may be CSI-RS, ZP-CSI-RS, SRS, DMRS, or SSB, etc. For example, the multiple measurement occasions may be for the Tx UE to transmit non-zero power RSs (CSI-RS, SSB, etc.). In this case, the purpose of the measurements is for the Rx UE to determine the best beam (or one or more improved beams) among a set of beams the Tx UE is transmitting.

When reporting the measurement, the Rx UE 704 may report measurement results from all the measurement occasions, or the Rx UE may report measurement results from some of the measurement occasions. For instance, the Rx UE 704 may select the one with higher or lower metrics, e.g., report the beam with higher RSRP, or report the beam with higher RSRQ, or report the beam with lower RSSI, etc. The Rx UE 704 may also report the index/indices of the beam(s) being reported, allowing the network entity 701 to identify the beams for SL scheduling.

As described herein, the BS schedules the transmission from the Tx UE to the Rx UE. The scheduling may be based on the measurement report directly from the Rx UE, or forwarded by the Tx UE. In certain aspects, the BS scheduler may indicate at least a location of time-frequency resource for the Tx UE to use for SL communication. For example, the scheduler of the BS may determine whether a resource allocated to one or more other sidelink UEs or one or more uplink UEs may be allocated to the Tx UE 702, based on the measurement report. As described herein, the measurement report indicates at least signal strength/quality from the Tx UE and/or interference level (e.g., RSRP measured on ZP-CSI-RS) seen by the Rx UE. Thus, the scheduler may determine that the resource can be allocated to the Tx UE if the interference level is smaller than some threshold and/or if the signal strength/quality from the Tx UE is above a threshold.

The BS scheduler may also indicate beam index for the Tx UE to use based on the measurement report. In other words, if the Rx UE is configured to measure and report beam quality based on a number of beams transmitted by the Tx UE, as described herein, the BS may indicate to the Tx UE the beam to be used for the SL communication based on the measurement report from the Rx UE.

In certain aspects, the BS's indication of the measurement (e.g., transmission of the measurement configuration 708) may be triggered by some event. For example, the measurement may be triggered by a scheduling request (e.g., scheduling/measurement request 706). The BS may configure the measurement in response to reception of a scheduling request (SR) from the Tx UE or the Rx UE.

In some cases, the measurement may be triggered by an event at the Tx/Rx UE. For example, when a UE(s) declare radio link failure (RLF) on sidelink, the BS may configure the measurement (or the UE may measure and report the measurement directly when RLF occurs). As another example, when the UE(s) detects change of beam pair link (BPL) on sidelink, the BS may configure the measurement (or the UE may measure and report the measurement directly). As another example, when the UE(s) experiences higher block error rate (BLER) (e.g., on the sidelink data channel and/or control channel) than a BLER target, the BS may configure the measurement (or the UE may measure and report the measurement directly). In some cases, the measurement may be performed by the Rx UE in a periodic manner. For example, the BS may configure periodical measurement for sidelink by configuring periodical transmission of measurement RSs.

Figure 8:
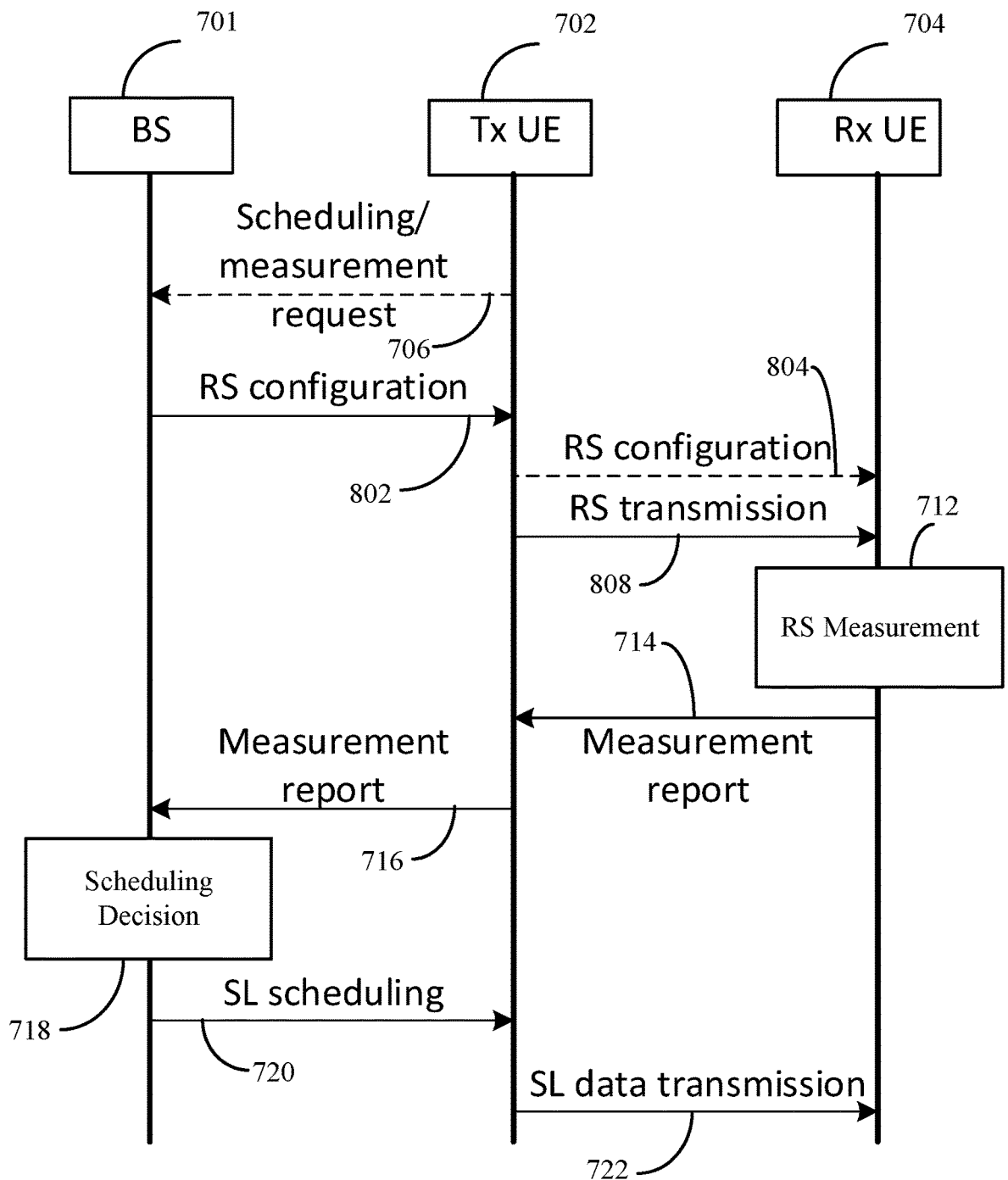
FIG. 8 is a call flow diagram for scheduling using a reference signal configuration transmission, in accordance with certain aspects of the present disclosure.

FIG. 8 is a call flow diagram for SL scheduling using an RS configuration transmission, in accordance with certain aspects of the present disclosure. As described herein, the sidelink Tx UE may, optionally, send a scheduling/measurement request 706 to the network entity 701. For instance, the Tx UE may transmit the scheduling/measurement request 706 when the Tx UE has declared RLF or experiences a change of BPL. The network entity 701 may then send an RS configuration 802 to the Tx UE 702 and the Tx UE 702 may transmit the RS configuration 804 to the Rx UE, followed by the RS transmission 808. In some cases, the Rx UE may receive the RS configuration directly from the network entity 701. In other words, the Tx UE may forward the RS configuration to the Rx UE if the Rx UE is not able to receive the RS configuration directly from the network entity 701.

There may be no explicit indication (configuration) for measurement from the BS. Rather, the Rx UE may perform the RS measurement when RS for measurement is configured via the RS configuration. As illustrated, the Tx UE 702 may transmit RS (e.g., non-zero power RS) based on the RS configuration 802. In some cases, the RS configuration 802 may indicate ZP RS, in which case, the Tx UE does not transmit on the resources indicated for ZP RS. At block 712, the Rx UE measures the RS (e.g., non-zero power RS and/or zero power RS), and reports the measurement (e.g., directly to the network entity or through the TX UE), allowing the BS to perform the sidelink scheduling based on the measurement report.

Figure 9:
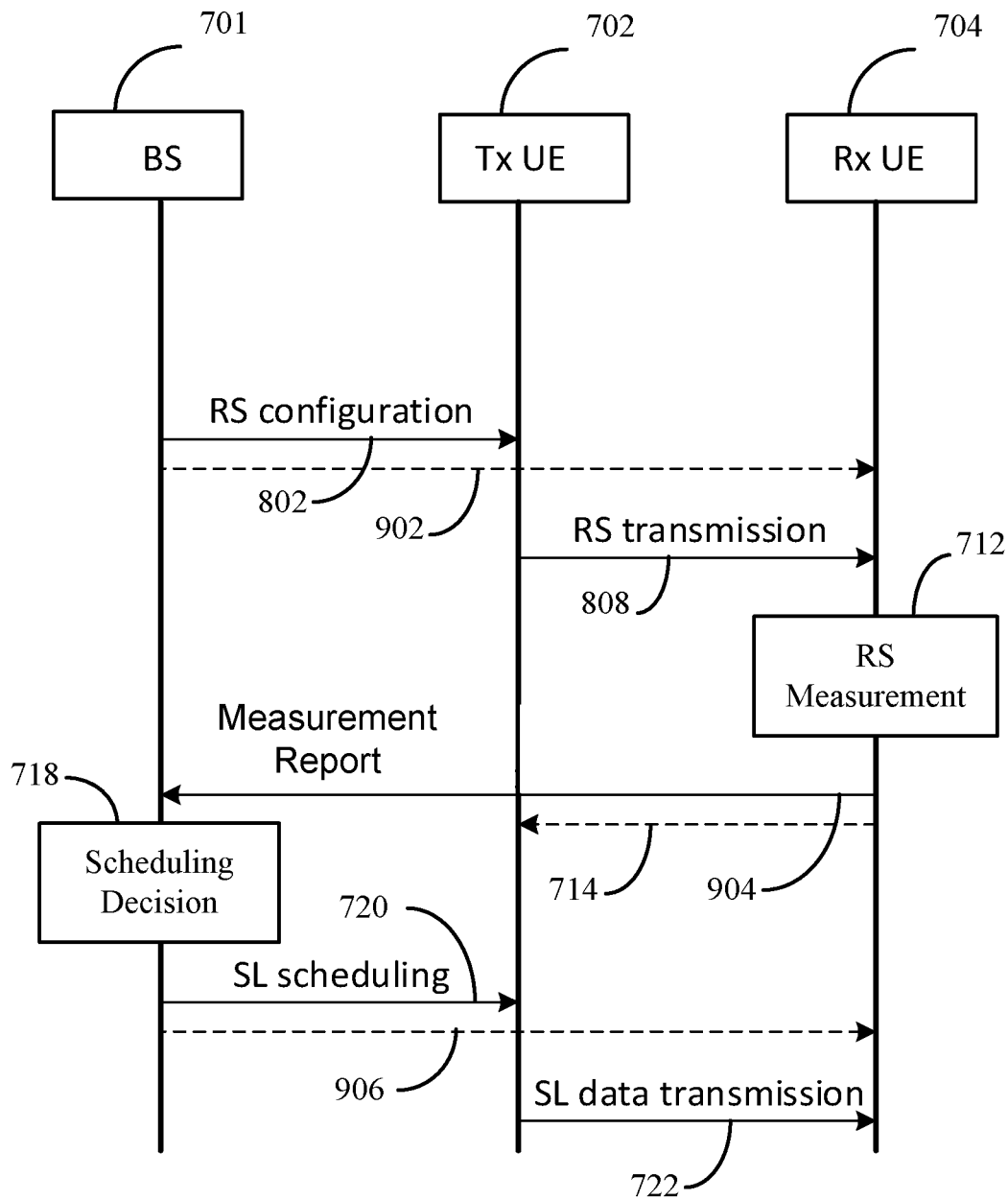
FIG. 9 is a call flow diagram for scheduling using periodically configured RS measurements, in accordance with certain aspects of the present disclosure.

FIG. 9 is a call flow diagram for SL scheduling using periodically configured RS measurements, in accordance with certain aspects of the present disclosure. In other words, there may be no burst event that triggers the measurement, as illustrated. Moreover, the Rx UE may be in direct communication with the network entity 701. For example, the RS configuration 902 may be transmitted directly from the network entity 701 to the Rx UE 704, as illustrated. In some cases, the RS configuration may be transmitted to the Tx UE 702, and the Tx UE 702 may transmit the RS configuration to Rx UE 704, if the Rx UE is not in direct communication with the network entity 701, as described herein. Moreover, the measurement report 904 may be transmitted from the Rx UE to the network entity 701, and the SL scheduling message 906 may be transmitted from the network entity 701 to the Rx UE 704.

Figure 10:
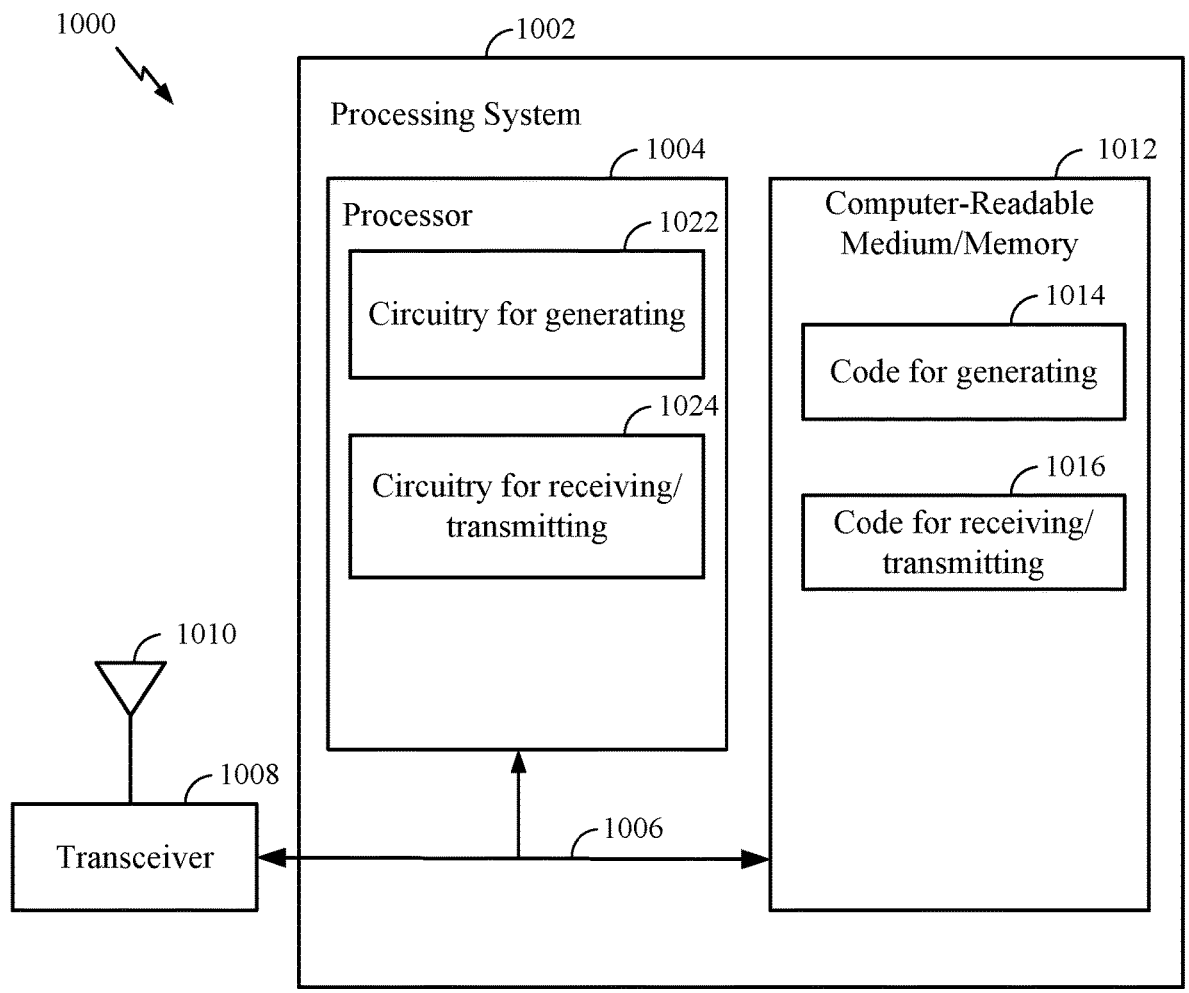
FIG. 10 illustrates a communications device that may include various components configured to perform operations for the techniques disclosed herein.

FIG. 10 illustrates a communications device 1000 that may include various components (e.g., corresponding to means-plus-function components) configured to perform operations for the techniques disclosed herein, such as the operations illustrated in FIG. 4. The communications device 1000 includes a processing system 1002 coupled to a transceiver 1008. The transceiver 1008 is configured to transmit and receive signals for the communications device 1000 via an antenna 1010, such as the various signals as described herein. The processing system 1002 may be configured to perform processing functions for the communications device 1000, including processing signals received and/or to be transmitted by the communications device 1000.

The processing system 1002 includes a processor 1004 coupled to a computer-readable medium/memory 1012 via a bus 1006. In certain aspects, the computer-readable medium/memory 1012 is configured to store instructions (e.g., computer-executable code) that when executed by the processor 1004, cause the processor 1004 to perform the operations illustrated in FIG. 4, or other operations for performing the various techniques discussed herein for distance-based HARQ signaling. In certain aspects, computer-readable medium/memory 1012 stores code 1014 for generating; code 1016 for receiving/transmitting, code 1018 for determining, and code 1020 for performing. In certain aspects, the processor 1004 has circuitry configured to implement the code stored in the computer-readable medium/memory 1012. The processor 1004 includes circuitry 1022 for generating; circuitry 1024 for receiving/transmitting; circuitry 1026 for determining; and circuitry 1028 for performing.

Figure 11:
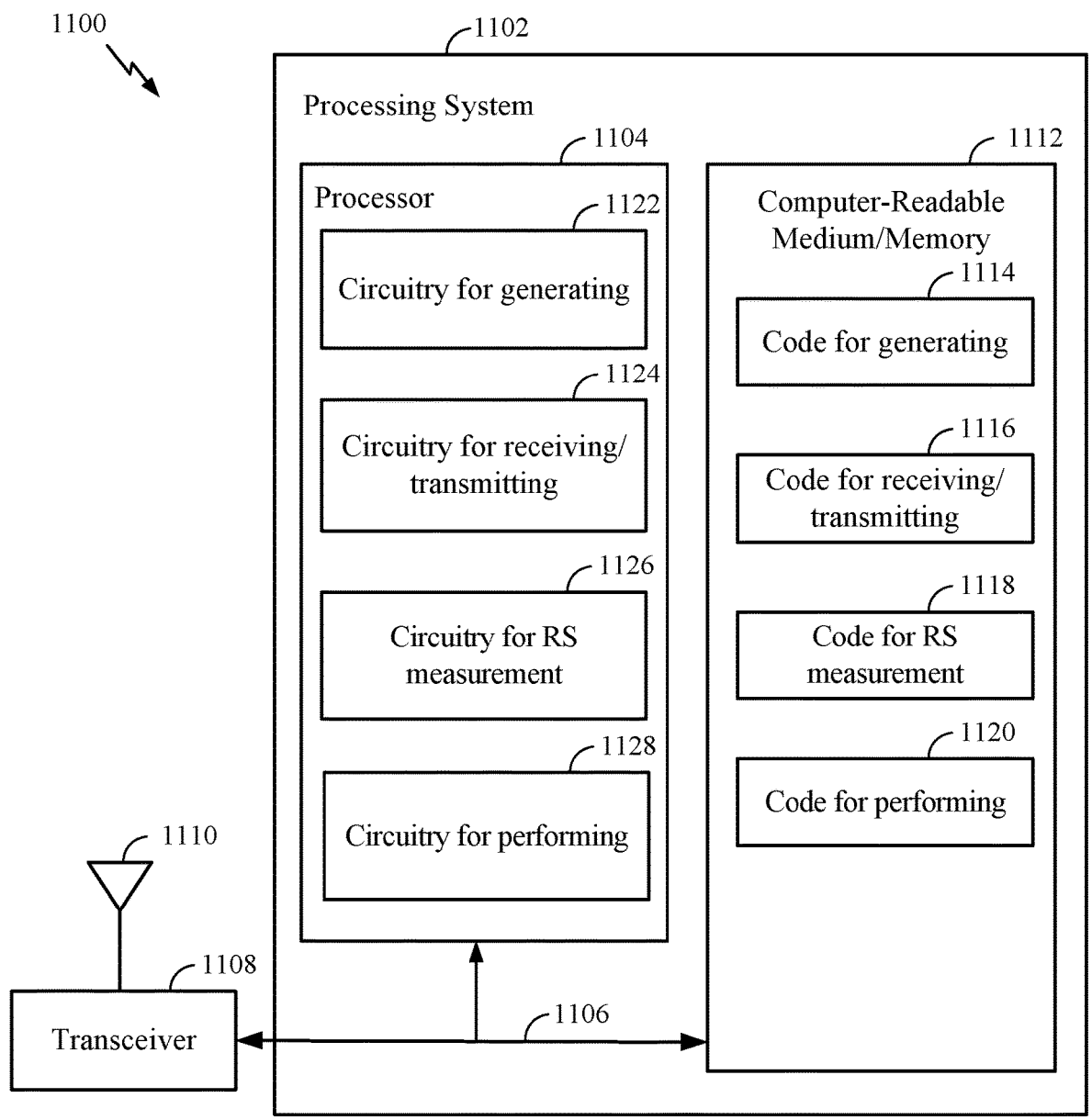
FIG. 11 illustrates a communications device that may include various components configured to perform operations for the techniques disclosed herein.

FIG. 11 illustrates a communications device 1100 that may include various components (e.g., corresponding to means-plus-function components) configured to perform operations for the techniques disclosed herein, such as the operations illustrated in FIGS. 5-6. The communications device 1100 includes a processing system 1102 coupled to a transceiver 1108. The transceiver 1108 is configured to transmit and receive signals for the communications device 1100 via an antenna 1110, such as the various signals as described herein. The processing system 1102 may be configured to perform processing functions for the communications device 1100, including processing signals received and/or to be transmitted by the communications device 1100.

The processing system 1102 includes a processor 1104 coupled to a computer-readable medium/memory 1112 via a bus 1106. In certain aspects, the computer-readable medium/memory 1112 is configured to store instructions (e.g., computer-executable code) that when executed by the processor 1104, cause the processor 1104 to perform the operations illustrated in FIGS. 5-6, or other operations for performing the various techniques discussed herein for distance-based HARQ signaling. In certain aspects, computer-readable medium/memory 1112 stores code 1114 for generating; code 1116 for receiving/transmitting, code 1118 for RS measurement (e.g., one or more actions to facilitate RS measurement), and code 1120 for performing. In certain aspects, the processor 1104 has circuitry configured to implement the code stored in the computer-readable medium/memory 1112. The processor 1104 includes circuitry 1122 for generating; circuitry 1124 for receiving/transmitting; circuitry 1126 for RS measurement (e.g., one or more actions to facilitate RS measurement); and circuitry 1128 for performing.

Example Aspects

Aspect 1. A method for wireless communication by a network entity, comprising: generating a configuration message for a user-equipment (UE) to perform one or more reference signal (RS) measurements on one or more resources of a sidelink channel; transmitting the configuration message; receiving a measurement report indicating results of the one or more RS measurements; and transmitting a scheduling message indicating resources for sidelink transmission on the sidelink channel.

Aspect 2. The method of aspect 1, wherein the configuration message is transmitted to another UE, and wherein the measurement report is received from the other UE.

Aspect 3. The method of one of aspects 1-2, wherein performing the one or more RS measurements comprises performing one or more zero power RS measurements on the one or more resources of the sidelink channel.

Aspect 4. The method of one of aspects 1-3, wherein the sidelink transmission comprises transmission from another UE to the UE, and wherein performing the one or more RS measurements comprises performing RS measurements based on at least one RS transmitted by the other UE.

Aspect 5. The method of one of aspects 1-4, wherein the configuration message indicates to the UE to perform the one or more RS measurements for multiple beams, and wherein the measurement report further indicates at least one of the multiple beams.

Aspect 6. The method of aspect 5, wherein the scheduling message indicates a beam of the multiple beams to be used for the sidelink transmission based on the measurement report.

Aspect 7. The method of aspect 5, wherein the at least one of the multiple beams comprises a beam having the highest signal quality of the multiple beams.

Aspect 8. The method of one of aspects 1-7, wherein the resources scheduled for the sidelink transmission is shared by the UE and at least one other UE.

Aspect 9. The method of aspect 8, wherein the resources are used for transmission by the at least on other UE for uplink transmission or sidelink transmission.

Aspect 10. The method of one of aspects 1-9, further comprising receiving a measurement request, wherein the generation of the configuration message is in response to the measurement request.

Aspect 11. A method for wireless communication by a user-equipment (UE), comprising: performing one or more reference signal (RS) measurements on one or more resources of a sidelink channel; generating a measurement report indicating results of the one or more RS measurements; and transmitting the measurement report to a network entity to be used for scheduling of sidelink transmissions on the sidelink channel.

Aspect 12. The method of aspect 11, further comprising receiving a configuration message indicating to the UE to perform the one or more RS measurements on the one or more resources of the sidelink channel.

Aspect 13. The method of one of aspects 11-12, further comprising receiving a scheduling message indicating resources for sidelink transmission on the sidelink channel, wherein the sidelink transmission comprises transmission from another UE to the UE, and wherein performing the one or more RS measurements comprises performing RS measurements based on at least one RS transmitted by the other UE.

Aspect 14. The method of one of aspects 11-13, wherein performing the one or more RS measurements comprises performing one or more zero power RS measurements on the one or more resources of the sidelink channel.

Aspect 15. The method of one of aspects 11-14, further comprising receiving a configuration message indicating to the UE to perform the one or more RS measurements on the one or more resources of the sidelink channel, wherein the configuration message indicates to the UE to perform the one or more RS measurements for multiple beams, and wherein the measurement report further indicates at least one of the multiple beams.

Aspect 16. The method of aspect 15, wherein the at least one of the multiple beams comprises a beam having the highest signal quality of the multiple beams.

Aspect 17. The method of one of aspects 11-16, further comprising receiving a RS configuration message configuring transmission, by another UE, of one or more RSs for the one or more RS measurements, wherein the one or more RS measurements are in response to the RS configuration message.

Aspect 18. The method of one of aspects 11-17, wherein the one or more RS measurements are performed in response to at least one of: a radio link failure (RLF) of the sidelink channel; a change in beam pair link on the sidelink channel; or detection of a block error rate associated with the sidelink transmission that is above a threshold.

Aspect 19. The method of one of aspects 11-18, further comprising: generating a measurement request in response to an event; transmitting the measurement request; and receiving a configuration message indicating to the UE to perform the one or more RS measurements on the one or more resources of the sidelink channel, the configuration message being in response to the measurement request.

Aspect 20. A method for wireless communication by a user-equipment (UE), comprising: receiving a configuration message associated with transmission of one or more reference signals (RSs) on one or more resources on a sidelink channel to be used for RS measurement by another UE; and taking one or more actions to facilitate the RS measurement by the other UE in accordance with the configuration message.

Aspect 21. The method of aspect 20, wherein the configuration message comprises a measurement configuration message indicating to the other UE to perform the one or more RS measurements, the method further comprising transmitting, to the other UE, the configuration message indicating to the other UE to perform the one or more RS measurements.

Aspect 22. The method of one of aspects 20-21, further comprising receiving, from the other UE, a measurement report indicating results of the RS measurement, and transmitting the measurement report to the network entity.

Aspect 23. The method of one of aspects 20-22, further comprising: receiving a scheduling message indicating resources for sidelink transmissions on the sidelink channel; and transmitting data to the other UE using the resources.

Aspect 24. The method of aspect 23, wherein the resources scheduled for the sidelink transmissions is shared by the UE and at least one other UE.

Aspect 25. The method of aspect 24, wherein the resources are used for transmission by the at least on other UE for uplink communication or sidelink transmission.

Aspect 26. The method of one of aspects 20-25, wherein the configuration message indicates to the UE to transmit the one or more RSs for each of a plurality of beams, and wherein the one or more actions comprise transmitting the one or more RSs in accordance with the configuration message.

Aspect 27. The method of one of aspects 20-26, further comprising generating a measurement request in response to an event, and transmitting the measurement request to the network entity, the configuration message being in response to the measurement request.

Aspect 28. The method of aspect 27, wherein the event comprises at least one of: a radio link failure (RLF) of the sidelink channel; a change in beam pair link on the sidelink channel; or detection of a block error rate associated with the sidelink channel that is above a threshold.

Aspect 29. The method of one of aspects 20-28, wherein the one or more RSs comprise non-zero power RSs.

Aspect 30. The method of one of aspects 20-29, wherein the configuration message configured resources for one or more zero-power RSs, and wherein the one or more actions comprise forgoing transmitting using the resources in accordance with the configuration.

The electromagnetic spectrum is often subdivided, based on frequency/wavelength, into various classes, bands, channels, etc. In 5G NR two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, or may be within the EHF band.

The techniques described herein may be used for various wireless communication technologies, such as NR (e.g., 5G NR), 3GPP Long Term Evolution (LTE), LTE-Advanced (LTE-A), code division multiple access (CDMA), time division multiple access (TDMA), frequency division multiple access (FDMA), orthogonal frequency division multiple access (OFDMA), single-carrier frequency division multiple access (SC-FDMA), time division synchronous code division multiple access (TD-SCDMA), and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). LTE and LTE-A are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). NR is an emerging wireless communications technology under development.

The techniques described herein may be used for the wireless networks and radio technologies mentioned above as well as other wireless networks and radio technologies. For clarity, while aspects may be described herein using terminology commonly associated with 3G, 4G, and/or 5G wireless technologies, aspects of the present disclosure can be applied in other generation-based communication systems.

In 3GPP, the term "cell" can refer to a coverage area of a Node B (NB) and/or a NB subsystem serving this coverage area, depending on the context in which the term is used. In NR systems, the term "cell" and BS, next generation NodeB (gNB or gNodeB), access point (AP), distributed unit (DU), carrier, or transmission reception point (TRP) may be used interchangeably. A BS may provide communication coverage for a macro cell, a pico cell, a femto cell, and/or other types of cells. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS.

A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet computer, a camera, a gaming device, a netbook, a smartbook, an ultrabook, an appliance, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, which may be narrowband IoT (NB-IoT) devices.

Certain wireless networks (e.g., LTE) utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a "resource block" (RB)) may be 12 subcarriers (or 180 kHz). Consequently, the nominal Fast Fourier Transfer (FFT) size may be equal to 128, 256, 512, 1024 or 2048 for system bandwidth of 1.25, 2.5, 5, 10, or 20 megahertz (MHz), respectively. The system bandwidth may also be partitioned into subbands. For example, a subband may cover 1.8 MHz (e.g., 6 RBs), and there may be 1, 2, 4, 8, or 16 subbands for system bandwidth of 1.25, 2.5, 5, 10 or 20 MHz, respectively. In LTE, the basic transmission time interval (TTI) or packet duration is the 1 ms subframe.

NR may utilize OFDM with a CP on the uplink and downlink and include support for half-duplex operation using TDD. In NR, a subframe is still 1 ms, but the basic TTI is referred to as a slot. A subframe contains a variable number of slots (e.g., 1, 2, 4, 8, 16, . . . slots) depending on the subcarrier spacing. The NR RB is 12 consecutive frequency subcarriers. NR may support a base subcarrier spacing of 15 KHz and other subcarrier spacing may be defined with respect to the base subcarrier spacing, for example, 30 kHz, 60 kHz, 120 kHz, 240 kHz, etc. The symbol and slot lengths scale with the subcarrier spacing. The CP length also depends on the subcarrier spacing. Beamforming may be supported and beam direction may be dynamically configured. MIMO transmissions with precoding may also be supported. In some examples, MIMO configurations in the DL may support up to 8 transmit antennas with multi-layer DL transmissions up to 8 streams and up to 2 streams per UE. In some examples, multi-layer transmissions with up to 2 streams per UE may be supported. Aggregation of multiple cells may be supported with up to 8 serving cells.

In some examples, access to the air interface may be scheduled. A scheduling entity (e.g., a BS) allocates resources for communication among some or all devices and equipment within its service area or cell. The scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. In some examples, a UE may function as a scheduling entity and may schedule resources for one or more subordinate entities (e.g., one or more other UEs), and the other UEs may utilize the resources scheduled by the UE for wireless communication. In some examples, a UE may function as a scheduling entity in a peer-to-peer (P2P) network, and/or in a mesh network. In a mesh network example, UEs may communicate directly with one another in addition to communicating with a scheduling entity.

In some examples, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some examples, the sidelink signals may be communicated using a licensed spectrum (unlike wireless local area networks, which typically use an unlicensed spectrum).

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module (s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein, for example, instructions for performing the operations described herein.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

The invention claimed is:

1. A method for wireless communication by a network entity, comprising:

receiving a scheduling request from at least one of a first user equipment (UE) or a second UE in response to a change in a beam pair link on a sidelink channel between the first UE and the second UE;
generating, after receiving the scheduling request, a configuration message configuring the first UE to perform one or more reference signal (RS) measurements on one or more resources of the sidelink channel;
transmitting the configuration message to the first UE and a second UE;
receiving a measurement report from the first UE indicating the one or more RS measurements; and
transmitting a scheduling message to the second UE scheduling resources for a sidelink transmission on the sidelink channel, wherein the scheduling message is based on the measurement report received from the first UE.

2. The method of claim 1, wherein the measurement report is also received from the second UE.

3. The method of claim 1, wherein the one or more RS measurements are based on one or more zero power RS measurements on the one or more resources of the sidelink channel.

4. The method of claim 1, wherein the sidelink transmission comprises a transmission from the second UE to the first UE, and wherein the one or more RS measurements are based on at least one RS transmitted by the second UE.

5. The method of claim 1, wherein the configuration message indicates to the first UE to perform the one or more RS measurements for multiple beams, and wherein the measurement report further indicates at least one of the multiple beams.

6. The method of claim 5, wherein the scheduling message indicates a beam of the multiple beams to be used for the sidelink transmission based on the measurement report.

7. The method of claim 5, wherein the at least one of the multiple beams comprises a beam having the highest signal quality of the multiple beams.

8. The method of claim 1, wherein the resources scheduled for the sidelink transmission are shared by the first UE and at least one second UE.

9. The method of claim 8, wherein the resources are configured for an uplink transmission or a sidelink transmission by the second UE.

10. A method for wireless communication by a first user equipment (UE), comprising:
transmitting a scheduling request to a network entity in response to a change in a beam pair link on a sidelink channel between the first UE and a second UE;
receiving, after transmitting the scheduling request, a configuration message to perform one or more reference signal (RS) measurements on one or more resources of the sidelink channel;
performing, based on the received configuration message, the one or more RS measurements on the one or more resources of the sidelink channel;
generating a measurement report indicating the one or more RS measurements; and
transmitting the measurement report to a network entity; and
receiving, based on the measurement report, a scheduling message indicating resources for a sidelink transmission on the sidelink channel.

11. The method of claim 10, further comprising receiving the configuration message indicating to the first UE to perform the one or more RS measurements on the one or more resources of the sidelink channel.

12. The method of claim 10, further comprising receiving a scheduling message indicating resources for sidelink transmission on the sidelink channel, wherein the sidelink transmission comprises a transmission from a second UE to the first UE, and wherein performing the one or more RS measurements comprises performing RS measurements based on at least one RS transmitted by the second UE.

13. The method of claim 10, wherein performing the one or more RS measurements comprises performing one or more zero power RS measurements on the one or more resources of the sidelink channel.

14. The method of claim 10, wherein the configuration message indicates to the first UE to perform the one or more RS measurements for multiple beams, and wherein the measurement report further indicates at least one of the multiple beams.

15. The method of claim 14, wherein the at least one of the multiple beams comprises a beam having the highest signal quality of the multiple beams.

16. The method of claim 10, further comprising receiving a RS configuration message configuring transmission, by a second UE, of one or more RSs for the one or more RS measurements, wherein the one or more RS measurements are in response to the RS configuration message.

17. The method of claim 10, further comprising:
generating a measurement request in response to an event;
transmitting the measurement request; and
receiving the configuration message indicating to the first UE to perform the one or more RS measurements on the one or more resources of the sidelink channel, wherein the configuration message is received in response to the measurement request.

18. A method for wireless communication by a second user equipment (UE), comprising:
transmitting a scheduling request to a network entity in response to a change in a beam pair link on a sidelink channel between the second UE and a first UE;
receiving, from the network entity after transmitting the scheduling request, a configuration message configuring transmission of one or more reference signals (RSs) on one or more resources on the sidelink channel for RS measurement at the first UE;
taking one or more actions to facilitate the RS measurement at the first UE in accordance with the configuration message, wherein the one or more actions comprise transmitting the one or more RSs in accordance with the configuration message; and
receiving, from the first UE, a measurement report indicating the one or more RS measurements; and
transmitting the measurement report to the network entity.

19. The method of claim 18, wherein:
the configuration message comprises a measurement configuration message comprising an indication for the first UE to perform the one or more RS measurements, and
the method further comprises transmitting, to the first UE, the configuration message indicating to the other UE to perform the one or more RS measurements.

20. The method of claim 18, further comprising:
receiving a scheduling message indicating resources for sidelink transmissions on the sidelink channel; and
transmitting data to the first UE using the resources.

21. The method of claim 20, wherein the resources scheduled for the sidelink transmissions are shared by the second UE and the first UE.

22. The method of claim 21, wherein the resources are configured for an uplink transmission or a sidelink transmission by the second UE.

23. The method of claim 18, wherein the configuration message indicates to the second UE to transmit the one or more RSs for each of a plurality of beams.

24. The method of claim 18, further comprising generating a measurement request in response to an event, and transmitting the measurement request to the network entity, wherein the configuration message is received in response to the measurement request.

25. The method of claim 24, wherein the event comprises at least one of:
- a radio link failure (RLF) of the sidelink channel;
- the change in the beam pair link on the sidelink channel; or
- detection of a block error rate associated with the sidelink channel that is above a threshold.

26. The method of claim 18, wherein the one or more RSs comprise non-zero power RSs.

27. The method of claim 18, wherein the configuration message configures resources for one or more zero-power RSs, and wherein the one or more actions comprise forgoing transmitting using the resources in accordance with the configuration.

* * * * *